Dec. 15, 1970 W. A. HAGGERTY 3,547,797
APPARATUS FOR SIMULTANEOUSLY ELECTROCHEMICALLY
MACHINING A PLURALITY OF PREVIOUSLY
FORMED SURFACES OF A WORKPIECE
Filed March 29, 1967 2 Sheets-Sheet 2

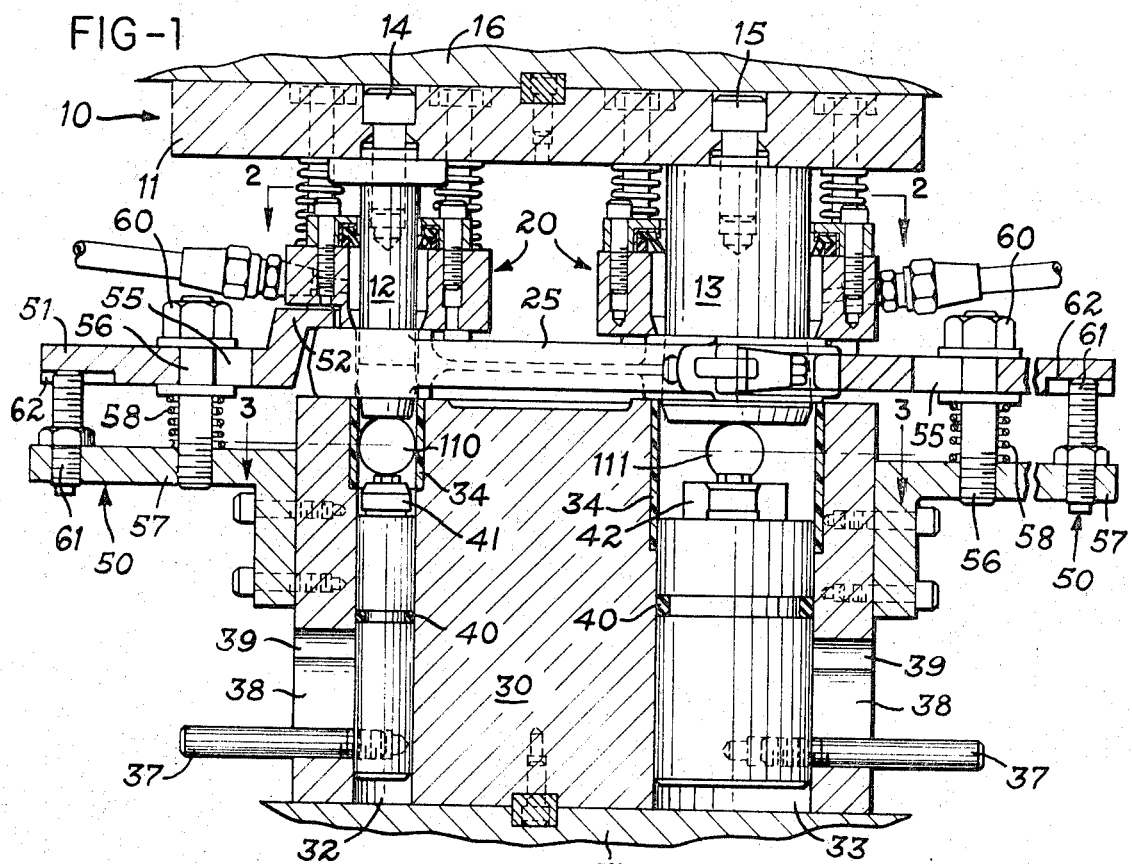

United States Patent Office 3,547,797
Patented Dec. 15, 1970

3,547,797
APPARATUS FOR SIMULTANEOUSLY ELECTRO-CHEMICALLY MACHINING A PLURALITY OF PREVIOUSLY FORMED SURFACES OF A WORKPIECE
William A. Haggerty, Cincinnati, Ohio, assignor to Cincinnati Milacron Inc., Cincinnati, Ohio, a corporation of Ohio
Filed Mar. 29, 1967, Ser. No. 626,732
Int. Cl. B23p 1/02; C23b 5/74, 5/70
U.S. Cl. 204—224
7 Claims

ABSTRACT OF THE DISCLOSURE

A plurality of electrochemical machining tools, each tool having an enlarging machining surface and a finishing machining surface, are moved simultaneously into a workpiece having a corresponding plurality of previously formed openings therein, such as a connecting rod for an internal combustion engine, to dimension, shape and align these openings within close tolerances. An electrolytic solution is passed between the tools and the workpiece to provide an electrically conductive medium for anodic removal of workpiece material with the fresh electrolyte passing first over the finishing machining surface of each electrochemical machining tool and then toward the enlarging finishing surface. The axial and cross sectional dimensions of the finishing machining surface of each tool are closely controlled to permit high accuracy in the dimensions of the finished opening.

RELATED APPLICATION

Reference is hereby made to my copending application, Ser. No. 626,901, filed on even date herewith, for Electrochemical Machining Tool.

BACKGROUND OF THE INVENTION

In the manufacture of connecting rods for use in internal combustion engines it has been the practice, when using conventional machining tools, to perform several different machining operations in the finishing of the wrist pin and crankshaft holes. Certain critical dimensions must be maintained as these holes are formed, such as the center distance between the holes, the angle of the axis of the holes with respect to each other, the hole diameter, and the "out of round" tolerance of each hole.

In the prior art method of forming connecting rods, the crankshaft openings in the connecting rod body and in the connecting rod cap are broached to within 0.010 inch of the finished dimension. The cap is then installed on the connecting rod body and the crankshaft hole then semi-finished bored. The wrist pin and crankshaft holes are then finish bored simultaneously with the diameter of the wrist pin hole being held within ±0.002 inch. The center distance between these holes is maintained within a 0.003 inch tolerance. The lock slot and oil holes are then deburred, such as by electrochemical machining, and then these holes are finishing honed individually to within ±0.0008 inch.

Inherent in the machining process described above is a tendency for the machining tools to be deflected by mechanical forces generated from assymmetrical contact with the previously formed opening in the workpiece, especially if the original rough cut hole were not properly aligned. If the original rough cut holes could be accurately located, the number of steps required for the machining operation could be reduced and the tolerances reduced for hole diameter, out of round, center distance, and parallel axis, thus producing higher quality parts. Alternatively, if a tool were designed which was insensitive to the original alignment of the rough cut hole, the aforementioned tolerances could also be reduced.

The electrochemical machining apparatus of this invention is especially useful in the finishing of rough cut openings in a connecting rod, or other similar articles where a plurality of surfaces are to be finished simultaneously and wherein a high degree of accuracy is to be maintained not only within the individual surfaces being formed but also the position of one surface relative to the other. With the apparatus described herein, no mechanical contact occurs between the tool and the workpiece and therefore mechanical forces do not act on the tool to deflect the tool from its original position. Consequently, higher degrees of accuracy can be maintained and, in addition, there is a reduction in the number of operations required to produce an article to its finished dimension than was previously possible with conventional cutting tools.

Continuing to use a connecting rod as an example, the connecting rod and the connecting rod cap are first individually broached to within 0.010 inch of the finished dimensions, as in the previous example, the parts assembled and placed on the electrochemical machining apparatus of this invention. Both the wrist pin and the crankshaft holes are then simultaneously finished to their final dimensions in one operation. Not only are the number of machining operations reduced considerably, but the finished dimensions can be held within closer tolerances than previously possible while these tolerances are not unduly effected by slight misalignment of rough cut holes since no mechanical contact is made between the tool and workpiece to disturb the original tool alignment.

SUMMARY OF THE INVENTION

This invention relates to an apparatus for simultaneously, electrochemically machining in a single operation, two or more previously formed surfaces of a workpiece to provide precisely dimensioned finished surfaces having the distances between the surfaces accurately maintained.

The electrochemical machining apparatus constructed according to this invention employs a plurality of tools each including a tapered enlarging machining surface providing a relatively large working area to machine a previously formed surface of the workpiece to its approximate finished dimension and a finishing machining surface to shape and to dimension the finished surface accurately. For example, each of the electrochemical machining tools for finishing in a single operation the openings in a connecting rod for internal combustion engines include a conically shaped enlarging machining surface having its leading portion of such dimensions that it is received into the previously formed opening in the workpiece without contact therewith but having the cross sectional dimension at its trailing portion larger than the previously formed opening. In the case of a connecting rod, the finishing machining surface, which is integral with the enlarging machining surface, is circular in cross section and has an accurately maintained axial dimension thus causing an even amount of overcut between the tool and the workpiece throughout the circumferential extent of the tool. Repeatability of the dimensions of the finished holes is therefore assured due to the geometry of the electrochemical machining tool even though some variations occur in other parameters of the electrochemical process such as voltage, electrolyte temperatures or volume flow, or feed rate.

By using the combination of a tapered enlarging machining surface to provide rapid removal of workpiece material and a finishing machining surface to control the final dimension and shape of the surface of the workpiece, superior results are obtained. While it is contemplated that a circular opening may be created in the workpiece without rotating the tool, it is understood that reduced "out of round" tolerances of the finished hole may be obtained if the tool were rotated on precision bearings.

The angle of the tapered machining surface is determined in part by the voltage applied to the tool and its feed rate into the workpiece. The length of this surface will depend upon the dimensions of the previously formed opening in the workpiece and the dimensions of the desired finished opening. The axial dimension of the finishing machining surface is made as small as possible, as for example in the order of 0.003 to 0.005 inch, to reduce the amount of overcut while providing a finishing machining surface having a controllable cross sectional configuration. With a small axial dimension of the fininshing machining surface, the overcut or distance between the machining surface of the tool and the workpiece is held as small as possible and therefore the variations in total overcut, which can be expressed in terms of percentages of variations in the other machining parameters, such as voltage, feed rate, and electrolyte conductivity, will be small. Thus, repeatability of dimensions between repeated machining operations is now possible, using the invention described herein.

The electrochemical machining tools included in the apparatus of this invention are further provided with an insulating surface located immediately adjacent the finishing machining surface and which extend to the rear of the tool to prevent further electrochemical machining of the workpiece. The insulating surface has substantially the same cross sectional dimensions as the fiinishing machining surface and is therefore flush with that surface, resulting in the smooth and uniform flow of electrolyte from the insulating surface across the finishing and tapered machining surfaces. The material used as an insulator is selected to have the same coefficient of expansion as the material used for the tool so that the insulating surface and the finishing machining surface remain flush throughout the operating range of the tool.

The electrochemical machining apparatus described herein is especially useful in finishing in a single operation a plurality of holes in a workpiece, such as a connecting rod. The electrochemical machining tools described above are rigidly mounted on a common tool holder and the tools moved simultaneously into the workpiece. Since no mechanical contact occurs between the tool and the workpiece, deflections of the tool from their original alignment are minimized and therefore the distance between the centers and the parellelism of the axis of the holes may be maintained within closer tolerances than was heretofore possible with conventional cutting tools. Those forces which do act on the tools to tend to alter their original orientation may be easily counteracted by providing sufficiently strong mountings when installing the tools on the holder which do not require the same strength as those mounting conventional cutting tools.

BRIEF DESCRIPTION OF THE DRAWINGS

FIG. 1 is an elevational view partly in section of the apparatus showing a workpiece, a workpiece fixture including alignment means, a plurality of electrochemical machining tools extending through previously formed openings on the workpiece, and an electrolyte manifold surrounding each tools;

FIG. 2 is a plan view taken along lines 2—2 in FIG. 1, showing the electrolyte manifold and a portion of one workpiece clamping member;

FIG. 3 is a cross sectional view taken long line 3—3 in FIG. 1 showing the electrolyte exit ports and workpiece alignment means;

FIG. 4 is an elevational cross sectional view taken along lines 4—4 in FIG. 2, showing the details of the mounting means for the electrolyte manifold and further showing the manifold in sealing engagement with the workpiece;

DESCRIPTION OF THE PREFERRED EMBODIMENT

Figure 5:
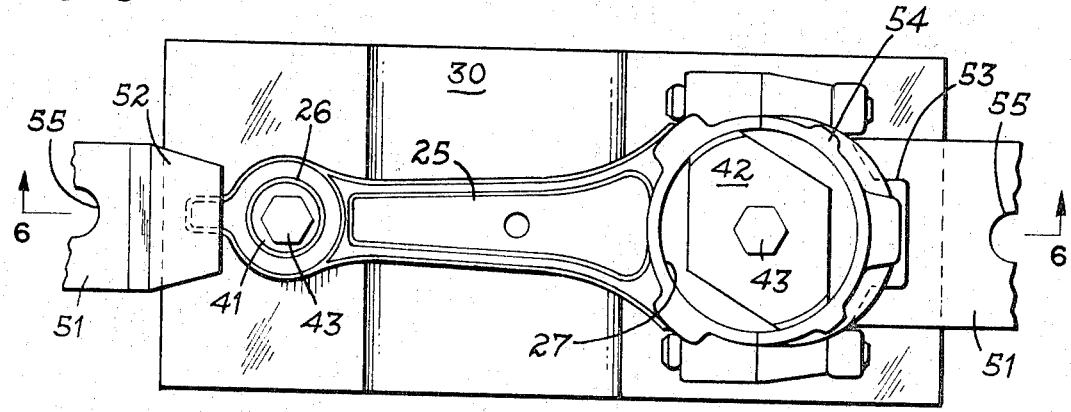
FIG. 5 is a plan view showing the workpiece supported on the fixture with the alignment means engaging the previously formed opening in the workpiece.

The mechanism shown generally at 10 in FIG. 1 includes a tool support 11 onto which is secured two electrochemical machining tools 12 and 13 by bolts 14 and 15, respectively. The tool support 11 is attached to drive member 16 for advancing the tools simultaneously at a predetermined feed rate relative to the workpiece. The details of the tool advancing mechanism are not shown herein but such a mechanism is well known to those skilled in the electrochemical machining art.

Surrounding each tool and also mounted on the support 11 are electrolyte manifolds 20. These manifolds surround each tool and are identical in their function although the relative dimensions of their component parts are proportioned according to the size of the tool which may be the same or different depending on the finish dimension of the final holes. The details of the mounting means for the electrolyte manifold will be discussed in detail hereinafter and it is to be understood that each manifold 20 receives electrolyte of such velocity that a smooth, uniform and adequate flow of electrolyte is provided downwardly around the tool and between the tool and the workpiece. A suitable pump, not shown, supplies the electrolyte to each manifold.

A workpiece 25, which in the example shown is a connecting rod for an internal combustion engine and which includes a wrist pin opening 26 and a connecting rod opening 27 (FIG. 5), is shown supported on a fixture 30. The fixture 30 is secured to a base member 31 on the machine and includes openings 32 and 33 which are spaced in alignment with the openings 26 and 27 in the workpiece. The openings 32 and 33 have a diameter sufficient to receive the tools 12 and 13 without contact. This is especially important since the tools and the fixture are of opposite electrical polarity. At least the upper portion of each of the openings 32 and 33 is enlarged and lined with an insulating material 34 which protects the fixture from anodic removal of fixture material during the electrochemical machining process.

Figure 6:
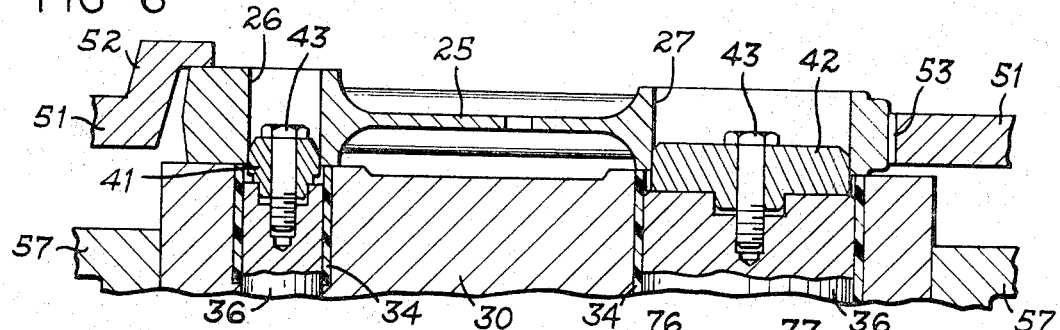
FIG. 6 is a cross sectional view taken along the lines 6—6 in FIG. 5.

A workpiece alignment means is situated within each of the openings 32 and 33 and each engages either the openings 26 or 27 in the workpiece 25 prior to the operator clamping the workpiece onto the fixture 30. Since the alignment means in both openings 32 and 33 have similar components, identical reference numerals will be used for corresponding parts. Thus, each of the alignment means including a cylindrical member 36 slidably mounted within the opening 32 and 33 with each member being provided with a handle 37 extending through a vertical slot 38 in the fixture 30. A horizontal slot 39 intersects the upper extent of the handle 37 after it has been manually moved to its uppermost position and rotated. The cylindrical member 36 may thus assume one of two positions. The first position is shown in FIG. 1 with the handle 37 resting at the lowermost portion of the vertical slot 38. The cylindrical members 36 are shown in their second position in FIG. 6 when the handles 37 are manually raised to the uppermost portion of the slot 38 and then rotated into the horizontal slot 39. While a manual workpiece alignment mechanism is shown, it is understood that an automatic alignment mechanism may be provided.

An O-ring 40 surrounds each of the cylindrical members 36 at a position above the uppermost extent of slots 38 when the cylinder 36 is in its lowermost position. These O-rings seal the openings 32 and 33 and prevent electrolyte from flowing around the cylinders 36 and out through the slots 38 and 39. At the uppermost portion of each of these cylindrical members 36 are the workpiece engaging alignment members 41 and 42. The workpiece engaging member 41 is circular in cross section and has a diameter substantially the same as the diameter of opening 26 in the workpiece. The exterior of the alignment member 41 is coated with an insulating material to prevent electrochemical machining thereof. The alignment member 42 is substantially diamond shaped, as shown in FIGS. 3 and 5, and is received into the opening 27 in the workpiece. This part is also coated with insulating material to prevent electrochemical machining thereof. Both the alignment parts 41 and 42 are secured to their respective cylindrical members by bolts 43.

It is thus apparent that initial alignment of the workpiece on the fixture may be accomplished by raising the handles 37 and placing them in the horizontal slots 39 to position the alignment means 41 and 42 above the upper surface of the fixture 30. The workpiece is then installed with the wrist pin opening 26 receiving the alignment means 41 and the connecting rod opening 27 receiving the alignment means 42. With the workpiece therefore aligned on the fixture 30, clamping means are used to fix the workpiece firmly on the fixture prior to the electrochemical machining operation. Once the workpiece is secured, the alignment means are then withdrawn into the openings 32 and 33 to the position shown in FIG. 1.

The workpiece 25 is secured by clamping means which form a part of the fixture. Again, since the clamping means 50 on each end of the workpiece are functionally similar, identical reference numerals will be used for corresponding parts. The clamping member 51, shown at the left in FIGS. 1, 2 and 5, is Z-shaped and has a portion 52 in engagement with the upper surface of the left end of the workpiece 25. The clamping member 51 at the right in FIGS. 1 and 5 has a bifurcated end 53 which engages the slot formed in the cap portion 54 of the workpiece 25. The specific clamp configuration used will, of course, depend on the type of workpiece being machined. Accordingly, various modifications may be made in the clamping arrangement to accommodate the various workpiece configurations which may be machined using the principles of the invention outlined herein.

Each of the clamping members 51 include an opening 55 through which extends a threaded shaft or bolt 56. One end of the bolt 56 is secured in a bracket 57 which in turn is mounted onto the fixture 30 by screws or other suitable fastening means. A spring 58 surrounds the bolt 56 in the area between the bracket 57 and the clamping member 51 to urge the clamping member 51 upwardly and away from the bracket 57. The nut 60 at the other end of the bolt 56 limits the upward movement of the clamping member 51.

The end of the clamping member 51 is supported by a threaded shaft 61 secured at its lower end to the bracket 57 and which slidably engages the member 51 in the elongated slots 62. The shaft 61 therefore forms a pivot about which the member 51 may rotate and tightening the nut 60 on the shaft 56 will move the member 51 about the pivot to bring the workpiece engaging portion of the clamp member 51 into engagement with the workpiece. The elongated slots 55 and 62 serve to permit the clamping member 51 to be moved out of the way during the installation and removal of the workpiece and during the initial alignment operation.

After the workpiece 25 is securely mounted on the fixture 30 with the openings 26 and 27 generally in alignment with the electrochemical machining tools 12 and 13, the tool support mechanism 16 is then moved relative to the fixture 30 with the lower surfaces of the electrolyte manifolds 20 engaging the upper surfaces of the workpiece 25. An adequate supply of electrolyte will then be directed into the manifold and, as the tool support mechanism continues to move toward the fixture, the electrochemical machining tools will begin machining the previously formed holes 26 and 27 simultaneously to their finished dimensions. While not shown in detail, it is understood that the electrochemical machining tools 12 and 13 are connected to the negative terminal of a direct current potential power supply while the workpiece 25 is connected through the fixture 30 to the positive terminal of the power supply.

Referring now to FIGS. 2 and 4, each of the manifolds 20 is mounted on the tool support 11 by four guide rods 65. These guide rods are bolted onto the support 11 and extend through an opening 66 in the body 67 of the manifold. The head 68 of each rod may be received into an expanded opening 69 concentric with the opening 66. The head 65 abuts the innermost extent of the opening 69 to limit the downward travel of the manifold 67 with respect to the rod 65. A spring 70 urges the manifold downwardly and when in the extended position provides sufficient preloading so that, as the manifold engages the workpiece, sufficient pressure will be applied to provide an adequate seal between the manifold and the workpiece and thus prevent loss of electrolyte which enters the manifold under pressure. Thus, as the tool support 11 moves downwardly, both of the manifolds 20 will engage the workpiece 25 and will be in sealing engagement therewith permitting the electrolyte applied into the manifold to be directed between the tools and the workpiece. The material from which the manifold body 67 is formed is electrically insulating to prevent current from flowing from the workpiece 25 into the tool support 11.

Electrolyte is supplied to the manifolds 20 through a plurality of nozzles 75. The nozzles 75 are so oriented that the electrolyte flows tangentially to and downwardly on the tools 12 and 13 thus rotating around the tools prior to entering the area between the machining surfaces of the tool and the workpiece. This arrangement provides for the smooth and even flow of electrolyte over the machining surfaces resulting in the smooth and accurate finishing of the workpiece. A seal 76 at the upper portion of each manifold includes a rubber ring 77 which sealingly engages the tool. This seal is conventional and includes a plurality of metal fingers which urge the ring 77 against the tool. The pressure of the electrolyte, typically in the order of 300 p.s.i., will aid in holding the ring 77 against the tool while allowing the tool to move downwardly. Other types of electrolyte manifolds may be used as long as they provide a smooth and uniform flow of electrolyte over the machining surfaces of the tool and between the tools and the workpiece.

Each of the tools 12 and 13 is carried by the tool support 11 and is secured thereto by screws 14 and 15. The tools 12 and 13 include a cylindrical shaft 80 which is provided at its upper portion with an extending circular lip 81 adapted to be received into a circular opening 82 having substantially the same diameter as the lip. This mounting arrangement not only provides accurate axial alignment of the tools and good mechanical support but also provides increased surface area insuring good electrical contact between the tool and tool support. Furthermore, the upper surface of the shaft 80 is carefully machined perpendicular to its axis thus providing a large surface area for engagement with the tool support 11. With the construction shown in FIG. 1, adequate mechanical strength is provided to prevent hydraulic forces which act on the tools during the machining operation from moving the tools out of their original alignment.

The electrolyte solution provides a path for the electrical current and supplies the necessary vehicle to remove the anodic products of the machining operation. This electrolyte solution, prepared by mixing four pounds of sodium nitrate and three-quarter pound of sodium chloride per gallon of water, is recirculated by means not shown after passing through the work area to cool the electrolyte to the desired operating temperature and to filter out these anodic products before the electrolyte is resupplied between the manifold 20 and then passed between the tool and the workpiece.

The electrolyte is directed uniformly over the machining surfaces of each tool so that there is uniform machining throughout the entire circumferential extent of the tool. In the preferred embodiment, fresh electrolyte moves downwardly of the tool shown in the drawings, and thus over the finishing machining surface of the tool and then over the enlarging or tapered machining surface. This prevents sludge or other deposits from forming on the finishing machining surface of the tool which might cause flow lines or other irregularities in the finished opening and insures that the most uniformly controlled conditions of electrolyte, such as temperature and composition, exist at the finishing machining surface. It is understood, however, that the electrolyte may flow between the tools and the workpiece in either direction as long as uniform electrolyte conditions over the finishing machining surfaces are maintained.

The workpiece will become heated in the areas adjacent the surfaces being machined due to the elevated temperature at which the electrolyte is normally maintained and also due to the energy released by the flow of electrical current between the workpiece and the tool. However, the dimensions of the workpiece will not be significantly altered due to this heating as long as the duration of the machining operation is kept relatively short, i.e., in the order of thirty seconds, since this workpiece heating is localized and a relatively long period of time is required for this localized heating to spread through the entire workpiece.

It is understood that to maintain accuracy in the finished dimensions of the workpiece the temperature variations in the electrolyte, the workpiece, the tools and the tool support must be held to a minimum since a variation in the individual temperature of any of these components will cause a corresponding variation in the dimension of the finished openings or the spacing between these openings. The amount of variation will depend, of course, on the magnitude of the temperature change and of the coefficients of expansion of the various components.

During the electrochemical machining operation, the electrolyte temperature has a tendency to increase due to the energy released as the electrical current passes from the workpiece to the tool. For this reason, a heat exchanger is provided through which the electrolyte is passed to maintain the electrolyte at a predetermined, usually elevated temperature, prior to the electrolyte being recirculated and resupplied into the space between the workpiec and the tool. The electrolyte is generally preheated prior to the machining operation and then maintained at the predetermined operating temperature throughout the machining operation.

Thus, to reduce changes in the workpiece temperature during the electrochemical machining operation, in the event that the machining operation is of sufficient duration that the dimensions of the workpiece are affected by the electrolyte temperature, the workpiece may be preheated to the same predetermined temperature as the electrolyte prior to its installation on the fixture. Alternatively, the electrolyte may be maintained at room temperature both prior to and throughout the machining operation, thus permitting each workpiece to be installed on the fixture and prepared for the machining operation without being preheated to any predetermined elevated temperature. Of course, it is understood that the tool dimensions and spacing will be appropriately chosen depending upon the temperature selected for the machining operation.

Figure 8:
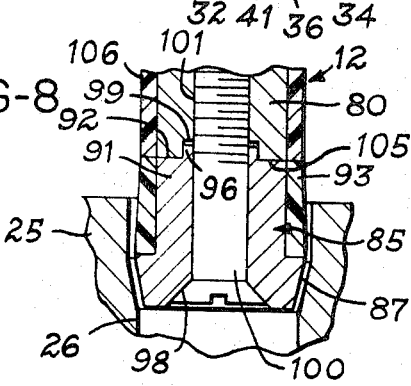
FIG. 8 is an elevational cross sectional view of one electrochemical machining tool used in this invention.
Figure 9:
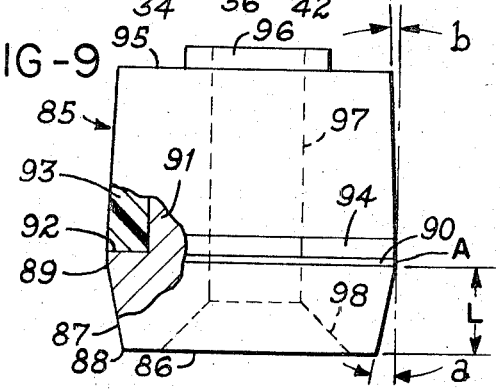
FIG. 9 is an enlarged elevational view of one electrochemical machining tool with a portion thereof shown in cross section to illustrate the details of its construction.

The electrochemical machining head of the tool is shown in detail in FIGS. 8 and 9, and is formed from a brass cylinder or other easily machined and electrically conductive material. The head 85 includes a forward face 86 substantially perpendicular to the long axis of the tool. Adjacent the forward surface 86 is a conically shaped or tapered enlarging electrochemical machining surface 87 whose taper is determined by the angle $a$ between the outer normal surface of the tool and the surface 87. In the embodiment shown, the angle $a$ is approximately 10°. The angle $a$ of the enlarging machining surface 87 is determined primarily by the voltage applied to the tool, and by the feed rate of the tool into the workpiece, and may vary between about 0° and 90°. For example, increasing the angle $a$ from 5° to 15° requires either an increase in voltage across the tool or a decrease in the feed rate of the tool into the workpiece. Stated another way, the angle $a$ is a cosecant function of the feed rate.

In designing a tool, the angle $a$ is selected within the range specified as a function of voltage and feed rate, the latter being determined primarily by the rate at which the machining operation is to be carried out. After the angle of the enlarging surface 87 is selected, the axial length L of the tool is determined so that the diameter of the forward face 86 is sufficiently small to permit insertion into a preformed opening in a workpiece.

As is apparent, the length L of tools having a surface tapered between about 5° and 15° may vary, but in each case, the leading portion 88 of the tool is proportioned to be received into the preformed opening in the workpiece so that the tool initially penetrates partially into the opening without contacting the workpiece. The trailing portion 89 of the surface 87 is proportioned in diameter to the desired finished dimension of the machined opening in the workpiece. Thus, it is apparent that the more material to be removed from the preformed opening in the workpiece, the longer must be the enlarging surface 87 in order for the leading face 86 to penetrate initially into the preformed opening.

The tapered enlarging electrochemical machining surface 87 therefore functions to provide a large surface area enabling the rapid removal of workpiece material and thus allows relatively large feed rates of the tool into and through the workpiece.

A finishing electrochemical machining surface 90 is located immediately adjacent and integral with the tapered machining surface 87 and functions to finish the opening in the workpiece to a precise dimension while removing only a minimum amount of additional workpiece material. In the embodiment shown in FIGS. 8 and 9, the finishing machining surface 90 is cylindrical and its outer surface is parallel with the axis of the tool as well as the direction of advancement of the tool into the workpiece. The axial dimension A of the finishing machining surface 90 is made a small as practically possible, i.e., in the order of 0.003 to 0.005 inch with this dimension being maintained to an accuracy of ±0.0005 inch. Thus, the axial dimension of the surface 90 at any position along the circumference does not differ from the axial dimension of any other position along the circumference by more than 0.001 inch. The finishing surface 90 is shown in these drawings exaggerated in size for the purpose of clarity in describing the invention, however, on an actual tool, the finishing surface 90 is practically invisible to the unaided eye.

The tool includes an axailly extending shank 91 of a diameter less than the diameter of the finishing surface 90 and located immediately adjacent to it. The shank is formed by a machining operation which results in an annular flat surface 92, which with trailing surface 89 of the tapered surface 87 defines the axial dimension of the finishing surface 90. The annular flat surface 92 is machined perpendicular to the axis of the tool and the finishing surface 90. The axis of the annular surface 92 is coaxial with the axis of the tool to provide the most uniform dimension for surface 90. The diameter of the shank 91 is about 0.220 inch smaller than the diameter of the finishing surface 90 so that the radial dimension of surface 92 is about 0.110 inch.

An insulating sleeve 93 of epoxy type material (reaction product of epichlorohydrin and bisphenol A) surrounds the shank 91 and is in contact with the annular flat surface 92. The material used as an insulator possesses essentially the same coefficient of thermal expansion as the material used for the tool. Additionally, the insulating material is non-porous, resistant to absorption of moisture for preventing passage of current through the insulating material to the workpiece, and relatively chemically inert with respect to the electrolyte which flows in the space between the tool and the workpiece. Typical insulating materials include a casting resin type RP-3260 available from Renn Plastics, Inc., Lansing Mich. or Stycast casting resin type 2651MM, available from Emerson and Cuming of Canton, Mass.

In making the tool, the initial tool dimensions are somewhat larger than the final tool dimensions, and the shank 91 is machined thereby forming flat surface 92. Thereafter, the insulating sleeve 93 is formed by casting the resin around the shank so that it is in abutting relationship with the surface 92. The outer surface of the tool is ground to provide the desired diameter, and the grinding operation removes not only a portion of the metal which ultimately forms the finishing machining surface 90, but also removes the portion of the sleeve 93 axially above surface 90. Thereafter, the tapered surface 87 is ground to the desired angle, and in the grinding operation the trailing portion 89, which determines the axial length of the finishing surface 90, is formed within the ranges previously described.

The insulating sleeve 93 includes a relatively short cylindrical section 94 axially above the surface 90 whose outer surface is coextensive with the finishing machining surface 90. The axial dimension of surface 94 is about 0.050 inch and is machined at the same time the finishing surface is machined. The remaining portion of the insulating sleeve 93 is tapered at a shallow angle b, typically in the order of 1°, to provide a relief permitting the smooth and uniform flow of electrolyte over the machining surface of the tool.

By providing an insulating material which has essentially the same coefficient of thermal expansion as the material used for the tool, exterior surface of the insulating sleeve axially of the finishing maching surface 90 remains flush to eliminate any projection which would result in non-uniform electrolyte flow. Since there may be a slight difference in the coefficient of thermal expansion of the sleeve and the metal of the tool, the total thickness of the insulting sleeve 93 is maintained relatively thin in order to reduce the total difference in expansion.

The rear face 95 of the head 85, including both the electrically conductive brass portion and the insulation, is machined perpendicular to the axis of the tool. A lip 96 is provided to assist in the alignment of the tool in the tool holder. The tool is provided with a hole 97 extending coaxially with and entirely through the tool with a countersunk portion 98 at the forward part for accommodating the head of a flat head screw. With this construction, easy assembly with and good electrical contact between the electrically conductive metallic portion of the tool and the shaft 80 is maintained.

Referring now to FIG. 8, the lip 96 on the head 85 is shown received into a recess portion 99 in the shaft 80 for axial alignment with the shaft 80. A screw 100 extends through the opening 97 in the tool and is received into the internally threaded opening 101 in the shaft 80 to maintain the tool rigidly in place and, in addition, to increase the electrical contact between the head 85 and the shaft 80.

The shaft 80 is constructed from an electrical conductor, such as brass, and has its front end 105 machined perpendicular to its axis to provide intimate contact with the surface 95 of the head 85 and thus permit high electrical currents to pass through the tool. A further path for the electrical current is through the head of the screw 100 which electrically contacts the tool through the countersunk hole 98, and the body of the screw which is received in the hole 97 and electrically contacting the tool body.

Surrounding the shaft 80 is a coating of insulation 106 having an outside diameter the same as the diameter of the insulation at the rear of head 85. This construction therefore provides a smooth interface between the tool and the workpiece and does not form a boundary causing turbulence in the electrolyte flow around the tool.

A source of negative potential is therefore applied through the drive means and the shaft 80 to the head 85. The drive means is conventional and moves the tool relative to the workpiece at a predetermined feed rate which, with the tools shown, is in the order of two inches per minute.

Extraneous machining currents between the insulated portion of the head 85 and shaft 80 and the workpiece 25 are prevented by maintaining the insulation 93 on the tool and insulation 106 on the shaft 80 square with the ends of their respective parts. When the head 85 is then placed in position on shaft 80, electrical contact is made and the end surface of the insulation 92 and 106 also abut and prevent electrolyte from entering between these parts to create a path for additional electrochemical machining current. A return passage for the electrolyte may be provided through the tool and tool support under some conditions.

Figure 7:
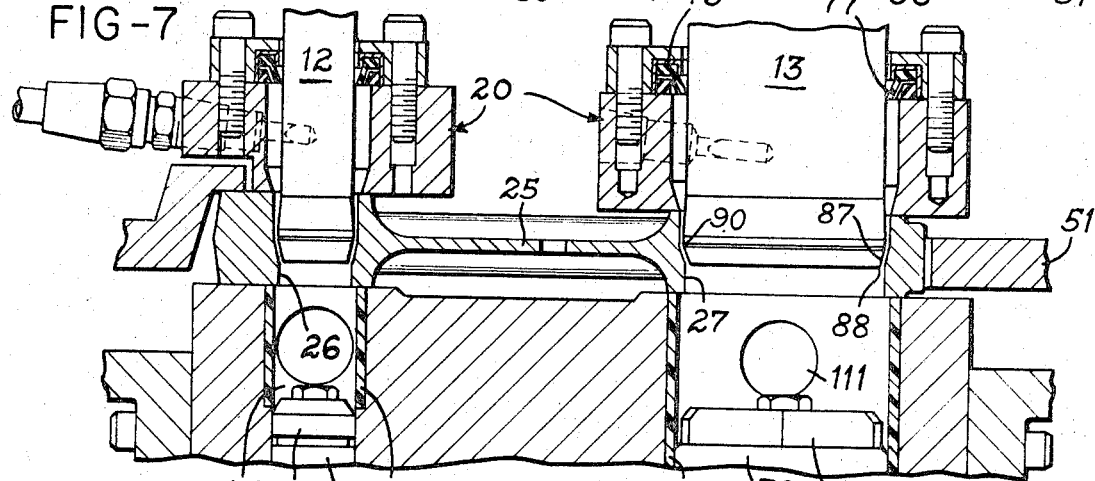
FIG. 7 is an elevational view partly in cross section showing a portion of the apparatus of FIG. 1 with the electrochemical machining tools extending partially into the previously formed openings in the workpiece.

The electrochemical machining operation accomplished by the tool of the present invention may be understood with reference to FIG. 7 which shows the tools 12 and 13 partially extending through openings 26 and 27 previously formed in the workpiece 25. For example, the leading portion 88 of the tool extends into the opening 27 without contact therewith while the tapered enlarging surface 87 functions to enlarge the opening to approximately the size and shape of the desired finished opening. The tool is moved downwardly at a constant rate, for example, in the order of two inches per minute, into the opening 27 with the tapered enlarging machining surface 87 providing a relatively large effective working area permitting the rapid penetration of the tool into the workpiece. The finishing machining surface 90 machines the opening 27 to the finished shape and size, and since it has a precisely maintained axial dimension extending circumferentially therearound, the amount of overcut provided by the finishing machined surface will be constant throughout the circumference of the tool. Operating the tool under the conditions set forth in the above description will produce an overcut of approximately 0.006 inch on each side of the tool for a total overcut of 0.012 inch. The insulation 93, whose axial length is greater than the thickness of the part being machined prevents further machining of the workpiece and thus maintains the dimension of the finished opening.

To prevent stray electrical currents and to protect the fixture 15 from electrochemical machining action, the forward surface 86 of the tool may be coated with insulation, although such additional insulation is not required for the proper operation of the tool.

While not shown, it is understood that the fixture 25 is connected to the positive terminal of an electrical power supply and the tool is connected through the platen and the tool support to the negative terminal of the same power supply. With this arrangement, anodic removal of the workpiece material will be accomplished and with the electrolyte flowing in the direction and under the pressure described, high microinch finishes of the machined opening and high feed rates of the tool through the workpiece are obtained.

With the electrolyte being supplied at a pressure in the order of 350 pounds per square inch into the manifold 20 and with the electrolyte passing over the finishing machining surface and then the enlarging or tapered machining surface and being exited through the openings 31 and 32 and out exit ports 110, the tools are then moved into the preformed openings of the workpiece and the opening enlarged by the tapered enlarging surface 87 and precisely dimensioned by the finishing machining surface 90. With a feed rate of two inches per minute and a potential difference between the workpiece and the tool in the order of twenty-two volts, the overcut created is in the order of 0.006 inch.

The electrolyte exit ports 110 are so positioned with respect to the upper surface of the mixture 30 and with respect to the workpiece alignment means that the electrolyte is permitted to pass uninterrupted through the fixture. As mentioned previously, the electrolyte may flow in either direction across the machining surfaces of the tool and therefore electrolyte may be introduced into the ports 110 and exited through the manifold nozzles 75. It is further contemplated that a restriction may be included in the electrolyte carrying hoses leading from the exit ports 110 to introduce back pressure on the electrolyte. Such back pressure is useful in some machining operations to insure that the electrolyte covers all areas of the tool—workpiece interface and completely fills the space between the tool and workpiece during the machining process and thus further increase the accuracy of the finished surfaces.

While the form of apparatus herein described constitutes a preferred embodiment of the invention, it is to be understood that the invention is not limited to this precise form of apparatus, and that changes may be made therein without departing from the scope of the invention.

What is claimed is:

1. An electrochemical machining apparatus for simultaneously finishing to precise dimensions a plurality of surfaces previously formed on an electrically conductive workpiece having dimensions different from the dimensions of the desired finished surfaces, said apparatus including:
    fixture means for supporting said workpiece;
    a plurality of electrochemical machining tools;
    means holding said plurality of tools in accurately spaced alignment;
    means supplying a smooth, uniform and adequate flow of electrolyte between each of said tools and said workpiece to provide an electrically conductive medium therebetween;
    means supplying electrical current between said plurality of tools and said workpiece of such a potential that all of said tools are negative with respect to said workpiece to cause electrochemical machining of said workpiece and to finish said previously formed surfaces thereof to a precisely controlled dimension and shape; and
    means providing for relative movement between said tools and said workpiece to advance all said tools simultaneously into said workpiece at a predetermined feed rate;
    each of said tools comprising
    an electrically conductive body having a longitudinal axis defining the direction of said tool travel relative to the workpiece, said body including a flat surface, a tapered machining surface, and a finishing machining surface,
    said flat surface being formed on said body and extending for a substantial distance from said finishing machining surface perpendicular to said longitudinal axis,
    said tapered machining surface formed on a forward portion of said body, and being inclined to said longitudinal axis at an angle of from 5° to 45° and dimensioned at the forward portion of said body to be received into the previously formed surface of the workpiece,
    said finishing machining surface formed on said body, oriented parallel to said longitudinal axis and located between said flat surface and said tapered machining surface, said flat surface and said tapered machining surface defining the dimension of said finishing machining surface in the longitudinal direction,
    and insulating means abutting and flush with said finishing machining surface for facilitating the smooth and uniform flow of electrolyte over both said machining surfaces and between the tool and the workpiece, said insulating means extending rearwardly from said flat surface to prevent electrical current from passing therethrough and thus to prevent further electrochemical machining of the workpiece by said conductive body.

2. The apparatus defined in claim 1 wherein said flow of electrolyte between said tool and said workpiece is in a direction such that fresh electrolyte passes from the finishing machining surface toward the enlarging machining surface of each tool.

3. The apparatus defined in claim 1 wherein said fixture means includes a plurality of openings therein in alignment with and larger than the surfaces of said workpiece to be finished;
    wherein each of said openings in said fixture is provided with an insulating coating to prevent electrochemical machining of said fixture; and
    wherein said fixture further including electrolyte exit means located in said openings at a position remote from the contact with said workpiece to allow said electrolyte to pass uninterrupted therethrough.

4. The apparatus defined in claim 3 further including alignment means mounted in the openings in said fixture and movable from a first position, wherein the alignment means extends beyond the openings to engage the previously formed surfaces of said workpiece to position said workpiece accurately with respect to said tools, to a second position remote from said workpiece and clear of said electrolyte exit means.

5. The apparatus defined in claim 1 wherein said means supplying a smooth and uniform flow of electrolyte includes:
    an electrolyte maniold surrounding each o said tools;
    means supporting each of said manifolds on said means holding said tools in accurately spaced alignment;
    spring means associated with said manifolds for urging each of said manifolds toward said workpiece so that, as the tools are advanced simultaneously toward said workpiece, the manifolds will contact and sealingly engage the workpiece;
    seal means mounted on each of said manifolds for sealingly engaging each of said tools; and
    means supplying adequate electrolyte to the space between the seal means engaging the tool and the seal created between the manifold and the workpiece so that electrolyte will flow between the tool and the workpiece both prior to initial penetration of the tool into the preformed opening in the workpiece and throughout the electrochemical machining operation.

6. The apparatus of claim 1 wherein the insulating means of each of said tools is formed from an electrically insulating material substantially impervious to moisture and which has approximately the same total thermal expansion as the tool material to insure a smooth surface interface between the insulating means and the finishing machining surface regardless of temperature variations in the operating range of the tools thus providing for smooth and uniform flow of electrolyte across the machining surfaces of each tool.

7. The apparatus of claim 1 wherein the finishing machining surface of each tool has a dimension in the longitudinal direction of 0.003±0.0005 inch.

References Cited
UNITED STATES PATENTS

| | | | |
|---|---|---|---|
| 3,285,844 | 11/1966 | Hallsworth et al. | 204—224X |
| 3,257,300 | 6/1966 | Williams | 204—143 |
| 3,306,838 | 2/1967 | Johnson | 204—284X |
| 3,409,535 | 11/1968 | Ross et al. | 204—225X |
| 3,410,781 | 11/1968 | Carlson et al. | 204—224 |
| 3,410,980 | 11/1968 | Gugger et al. | 204—143 |

JOHN H. MACK, Primary Examiner

D. R. VALENTINE, Assistant Examiner

U.S. Cl. X.R.

204—225, 297